United States Patent [19]

Saito et al.

[11] Patent Number: 5,796,574
[45] Date of Patent: Aug. 18, 1998

[54] VITREOUS CARBON-ACTIVE CARBON COMPOSITE MATERIAL, PROCESS FOR PRODUCING SAID COMPOSITE MATERIAL, AND POLARIZABLE ELECTRODE USING SAID COMPOSITE MATERIAL FOR USE IN ELECTRIC DOUBLE LAYER CAPACITOR

[75] Inventors: Kazuo Saito; Atsushi Hagiwara, both of Tokyo, Japan

[73] Assignee: Nisshinbo Industries, Inc., Tokyo, Japan

[21] Appl. No.: 587,137

[22] Filed: Jan. 16, 1996

Related U.S. Application Data

[63] Continuation of Ser. No. 245,897, May 19, 1994, abandoned.

[30] Foreign Application Priority Data

May 24, 1993 [JP] Japan .................................. 5-145710

[51] Int. Cl.$^6$ ........................................................ H01B 1/04
[52] U.S. Cl. ........................... 361/502; 361/303; 361/504; 361/525; 361/305; 428/367; 428/408; 252/502; 429/191
[58] Field of Search ..................... 423/445 R; 429/191; 361/305, 502, 303, 504, 525; 428/367, 408; 252/502

[56] References Cited

U.S. PATENT DOCUMENTS

| | | | |
|---|---|---|---|
| 4,388,163 | 6/1983 | Richter et al. | 204/101 |
| 4,810,599 | 3/1989 | Kondo et al. | 429/191 |
| 4,831,011 | 5/1989 | Oikawa et al. | 502/418 |
| 5,152,941 | 10/1992 | Takaku et al. | 423/445 R |
| 5,554,354 | 9/1996 | Sugino et al. | 423/445 R |

*Primary Examiner*—Michael Lewis
*Assistant Examiner*—Stuart L. Hendrickson

[57] ABSTRACT

The present invention provides:

a vitreous carbon-active carbon composite material wherein the vitreous carbon is derived from a polycarbodiimide resin;

a process for producing the above vitreous carbon-active carbon composite material, which comprises firing a mixture of a polycarbodiimide resin and an active carbon, or a molded article of desired shape prepared from said mixture, in a non-oxidizing atmosphere; and a polarizable electrode for use in electric double layer capacitor, which consists of the above vitreous carbon-active carbon composite material.

Said electrode is free from the drawbacks of prior art, has a low internal resistance, causes a low degree of powder detachment, has large electric capacitance per unit weight and per unit volume, and can be produced easily, quickly and inexpensively.

7 Claims, No Drawings

VITREOUS CARBON-ACTIVE CARBON COMPOSITE MATERIAL, PROCESS FOR PRODUCING SAID COMPOSITE MATERIAL, AND POLARIZABLE ELECTRODE USING SAID COMPOSITE MATERIAL FOR USE IN ELECTRIC DOUBLE LAYER CAPACITOR

This application is a continuation of application Ser. No. 08/245,897 filed May 19, 1994, now abandoned.

FIELD OF THE INVENTION

The present invention relates to a vitreous carbon-active carbon composite material, a process for producing said composite material, and a polarizable electrode using said composite material for use in electric double layer capacitor.

PRIOR ART

Various proposals were made on the polarizable electrodes using active carbon or the like for use in electric double layer capacitor. That is, there were proposed, for example, a paste-like polarizable electrode obtained by mixing an active carbon powder with an electrolyte [Japanese Patent Application Kokai (Laid-Open) No. 102914/1989], a polarizable electrode obtained by activating an active carbon fiber [Japanese Patent Application Kokai (Laid-Open) No. 19271 6/1991], a polarizable electrode obtained by activating a carbon block [Japanese Patent Application Kokai (Laid-Open) No. 1416291/1991], and a polarizable electrode obtained by treating an active carbon with a binder such as polyethylene, polypropylene or the like [Japanese Patent Application Kokai (Laid-Open) No. 22062/1992].

The polarizable electrodes using an active carbon or an active carbon fiber, however, have drawbacks of high internal resistance owing to the insufficient contact between active carbon particles, or of capacitance reduction owing to the detachment of powder or fiber. The polarizable electrode obtained by activating a carbon block is free from the drawbacks of high internal resistance and powder detachment, but is unable to have a large electric capacitance per unit volume or unit weight because said activation is conducted only on the surface of carbon block and is not conducted in the interior. The polarizable electrode using a binder such as polyethylene, polypropylene or the like has a drawback of low adsorbability and accordingly low capability.

SUMMARY OF THE INVENTION

The objects of the present invention are to provide a polarizable electrode which is free from the drawbacks of prior art, which has a low internal resistance, which causes a low degree of powder detachment, which has large electric capacitance per unit weight and per unit volume, and which can be produced easily, quickly and inexpensively; and a vitreous carbon-active carbon composite material suitably used in production of said polarizable electrode.

The present inventors made a study in order to achieve the above objects, based on the following idea. That is, since the vitreous carbon derived from a polycarbodiimide resin has excellent chemical resistance and has a low tendency for formation of intercalation complex, said vitreous carbon, when placed in an electrolyte (e.g. strong acid, strong alkali or organic solvent) used in electric double layer capacitor, might be able to show sufficient electric conductivity and, even after repeated charging and discharging, might be able to show no deformation due to formation of intercalation compound and retain the original shape; as a result, said vitreous carbon might be able to provide a polarizable electrode which has a low internal resistance, which causes no deformation and which has large electric capacitance per unit weight and per unit volume. As a result, the present invention has been completed.

The present invention provides:

a vitreous carbon-active carbon composite material wherein the vitreous carbon is derived from a polycarbodiimide resin, a process for producing the above vitreous carbon-active carbon composite material, which comprises firing a mixture of a polycarbodiimide resin and an active carbon, or a molded article of desired shape prepared from said mixture, in a non-oxidizing atmosphere, and a polarizable electrode for use in electric double layer capacitor, which consists of the above vitreous carbon-active carbon composite material.

DETAILED DESCRIPTION OF THE INVENTION

The present invention is hereinafter described in detail.

The vitreous carbon used in the vitreous carbon-active carbon composite material of the present invention (said vitreous carbon corresponds to the binder used in the prior art) is a non-permeable amorphous carbon material obtained by firing a thermosetting resin in an inert gas. Vitreous carbon is known in the art. The vitreous carbon used in the present invention is a vitreous carbon obtained by firing a polycarbodiimide resin disclosed for example, in Japanese Patent Application Kokai (Laid-Open) No. 209712/1992.

The above polycarbodiimide resin may be a known product or can be produced in the same manner as for known product [see U.S. Pat. No. 2,941,956; Japanese Patent Publication No. 33279/1972; J. Org. Chem., 28, 2069–2075 (1963); Chemical review 1981, vol. 81, No. 4, 619–621]. It can be easily produced, for example, by a condensation reaction wherein an organic diisocyanate is subjected to removal of carbon dioxide. The organic diisocyanate used in production of polycarbodiimide resin may be any of an aliphatic type, an alicyclic type, an aromatic type, an aralkyl type, etc. They can be used singly or in combination of two or more (in the latter case, a copolycarbodiimide is obtained).

The organic diisocyanate is preferably an organic diisocyanate capable of giving a crystalline polycarbodiimide. Such an organic diisocyanate is exemplified by at least one compound selected from the group consisting of 4,4'-diphenylmethane diisocyanate, p-phenylene diisocyanate, 4,4'-diphenyl ether diisocyanate and 3,3'-dimethoxy-4,4'-diphenyl diisocyanate. 4,4'-Diphenylmethane diisocyanate is particularly preferable.

It is possible to add, to the organic diisocyanate, other organic diisocyanate or a monoisocyanate to control the molecular weight of the polycarbodiimide obtained. For mixing with, for example, 4,4'-diphenylmethane diisocyanate, the other organic diisocyanate is particularly preferably tolylene diisocyanate (TDI), and the monoisocyanate is particularly preferably phenyl isocyanate.

The condensation reaction wherein an organic diisocyanate is subjected to removal of carbon dioxide, is conducted in the presence of a carbodiimidization catalyst. The carbodiimidization catalyst includes, for example, phospholene oxides such as 3-methyl-1-phenyl-2-phospholene-1-oxide, 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof. Of them, 3-methyl-1-phenyl-2-phospholene-1-oxide is preferable in view of the reactivity.

The active carbon used in the vitreous carbon-active carbon composite material of the present invention is not particularly restricted. It includes active carbons obtained by carbonizing a natural vegetable (e.g. sawdust or coconut shell), an aromatic polycyclic compound obtained from coal, petroleum or the like, or a synthetic resin of phenolic type, acrylic type, aromatic polyamide type, cellulose type or the like, and then activating the resulting carbon by an ordinary method.

The shape of the active carbon may be a powder, particles, a fiber or the like. The specific surface area of the active carbon is not particularly restricted, either, but is preferably 500 m$^2$/g or larger.

The proportions of the vitreous carbon derived from a polycarbodiimide resin and the active carbon may be appropriately determined depending upon, for example, the properties of the desired vitreous carbon-active carbon composite material; however, the vitreous carbon is used in an amount of, for example, 0.5–100 parts by weight, preferably 1–50 parts by weight as solid per 100 parts by weight of the active carbon.

The vitreous carbon-active carbon composite material of the present invention is a composite material between two main components, i.e. a vitreous carbon derived from a polycarbodiimide resin and an active carbon, and can be produced by a process described below.

First, the above-mentioned polycarbodiimide resin is mixed with an active carbon to obtain an active carbon mixture. In this mixing step, there can be used a mixing method ordinarily used industrially, for example, a method using stirring rods, a kneader, a ball mill, a sample mill, a mixer, a static mixer, a ribbon mixer or the like.

The active carbon mixture is then molded into a desired shape. This molding step can be conducted by a known method such as pressure molding, hydrostatic pressure molding, extrusion, injection molding, belt pressing, hot pressing, roll pressing or the like.

The molded material is then fired. This firing step can be conducted by a known method, under vacuum or in a non-oxidizing atmosphere such as nitrogen, argon, hydrogen or the like. The firing temperature has no upper limit but desirably is 600°–3,000° C., preferably 700°–1,500° C. When the firing temperature is higher than 3,000° C., the firing furnace undergoes excessive oxidative exhaustion. When the firing temperature is lower than 600° C., the firing product has a high internal resistance and a low electric capacitance.

The thus obtained vitreous carbon-active carbon composite material of the present invention can be used, as it is or after cutting into an appropriate shape, as a polarizable electrode for electric double layer capacitor.

The present invention is hereinafter described specifically by way of Examples.

Production (1) of polycarbodiimide resin 675 g of 4,4'-diphenylmethane diisocyanate and 71.4 g of phenyl isocyanate were reacted in 2,485 g of tetrachloroethylene (resin concentration=20%) in the presence of 1.50 g of 3-methyl-1-phenyl-2-phospholene-1-oxide (a carbodiimidization catalyst) at 120° C. for 4 hours to obtain a light yellow transparent polycarbodiimide solution. The solution was cooled to 40° C. in 12 hours to obtain a polycarbodiimide slurry. The slurry had a viscosity of 270 cp. The slurry was subjected to spray drying to obtain a light yellowish white polycarbodiimide powder.

Production (2) of polycarbodiimide resin 54 g of a (80/20) mixture of 2,4-tolylene diisocyanate and 2,6-tolylene diisocyanate was reacted in 500 ml of tetrachloroethylene in the presence of 0.12 g of 3-methyl-1-phenyl-2-phospholene-1-oxide (a carbodiimidization catalyst) at 120° C. for 4 hours to obtain a polycarbodiimide solution.

Example 1

The above-obtained polycarbodiimide powder (average particle diameter =10 μm) and an active carbon powder (average particle diameter=10 μm, specific surface area=1,800 m$^2$/g) were mixed at the mixing ratios shown in Table 1. Each mixture was agitated for 24 hours by a ball mill, then placed in a square mold having an internal dimension of 50 mm×50 mm, and subjected to pressure molding at a pressure of 30 kg/cm$^2$ at 100° C. for 30 minutes to obtain a molded article. Each molded article was heated, in a nitrogen atmosphere, to a temperature shown in Table 1 at a temperature elevation rate of 20° C. per hour to effect firing, whereby various vitreous carbon-active carbon composite materials were obtained.

TABLE 1

| Sample | Mixing ratio (wt. %) | | Firing |
|---|---|---|---|
| No. | Active carbon | Polycarbodiimide powder | Temp. (°C.) |
| 1-1 | 100 | 0.5 | 700 |
| 1-2 | 100 | 0.5 | 900 |
| 1-3 | 100 | 0.5 | 1200 |
| 1-4 | 100 | 0.5 | 1500 |
| 1-5 | 100 | 25 | 700 |
| 1-6 | 100 | 25 | 900 |
| 1-7 | 100 | 25 | 1200 |
| 1-8 | 100 | 25 | 1500 |
| 1-9 | 100 | 100 | 700 |
| 1-10 | 100 | 100 | 900 |
| 1-11 | 100 | 100 | 1200 |
| 1-12 | 100 | 100 | 1500 |

From each of the composite materials obtained above was cut out a disc-shaped electrode of 10 mm in diameter and 1 mm in thickness. The electrode was measured for resistivity by a DC four-probe method. By using the electrode as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance.

Incidentally, electric capacitance was calculated by charging each capacitor with a constant current of 20 mA, then discharging the capacitor at a constant current of 20 mA, and measuring the time in which the voltage dropped from 1 V to 0 V. This electric capacitance was divided by the volume of electrode, whereby an electric capacitance per unit volume was calculated. Separately, a constant current of 1 kHz and 10 mA was allowed to pass through each capacitor and the voltage between electrodes was measured, whereby an equivalent series resistance was obtained. The results of the resistivity, capacitance per unit volume and equivalent series resistance of each capacitor are shown in Table 2.

TABLE 2

| Sample No. | Resistivity ($\Omega \cdot cm$) | Electric capacitance per unit volume (F/cm$^3$) | Equivalent series resistance ($\Omega$) |
|---|---|---|---|
| 1-1 | $4.3 \times 10^{-1}$ | 61.2 | 6.3 |
| 1-2 | $1.2 \times 10^{-2}$ | 70.3 | 1.5 |
| 1-3 | $7.3 \times 10^{-3}$ | 59.3 | 1.2 |
| 1-4 | $5.2 \times 10^{-3}$ | 43.2 | 1.1 |
| 1-5 | $3.1 \times 10^{-1}$ | 70.3 | 5.9 |
| 1-6 | $1.0 \times 10^{-2}$ | 75.4 | 1.3 |
| 1-7 | $6.1 \times 10^{-3}$ | 68.9 | 1.1 |
| 1-8 | $4.9 \times 10^{-3}$ | 51.2 | 0.9 |
| 1-9 | $5.2 \times 10^{-1}$ | 30.5 | 7.1 |
| 1-10 | $4.5 \times 10^{-2}$ | 37.2 | 1.1 |
| 1-11 | $5.3 \times 10^{-3}$ | 29.3 | 0.7 |
| 1-12 | $1.3 \times 10^{-3}$ | 25.2 | 0.7 |

Example 2

Each of the vitreous carbon-active carbon composite material Nos. 1-1, 1-2, 1-4, 1-5, 1-6, 1-8, 1-9, 1-10 and 1-12 was made into an electrode in the same manner as in Example 1. Each electrode was used as a positive electrode and also as a negative electrode, and the two electrodes were impregnated, under vacuum, with 30 wt. % sulfuric acid to obtain an electric double layer capacitor. Each capacitor was measured for electric capacitance and calculated for electric capacitance per unit volume and equivalent series resistance in the same manners as in Example 1. The results are shown in Table 3.

TABLE 3

| Sample No. | Electric capacitance per unit volume (F/cm$^3$) | Equivalent series resistance (m$\Omega$) |
|---|---|---|
| 1-1 | 120.4 | 58 |
| 1-2 | 131.8 | 25 |
| 1-4 | 107.5 | 20 |
| 1-5 | 202.1 | 43 |
| 1-6 | 210.8 | 20 |
| 1-8 | 189.2 | 18 |
| 1-9 | 95.2 | 32 |
| 1-10 | 100.7 | 21 |
| 1-12 | 89.1 | 15 |

Example 3

The above-obtained solution of 15% of polycarbodiimide in tetrachloroethylene and an active carbon powder (average particle diameter=10 μm, specific surface area=1,800 M$^2$/g) were mixed at the mixing ratios shown in Table 4. Each mixture was agitated for 24 hours to obtain a paste. Each paste was cast and heated, in a nitrogen atmosphere, to a temperature shown in Table 4 at a temperature elevation rate of 20° C. per hour to effect firing, whereby various vitreous carbon-active carbon composite materials were obtained.

TABLE 4

| Sample No. | Mixing ratio (wt. %) | | Firing Temp. (°C.) |
|---|---|---|---|
| | Active carbon | Polycarbodiimide powder | |
| 3-1 | 100 | 0.5 | 700 |
| 3-2 | 100 | 0.5 | 900 |
| 3-3 | 100 | 0.5 | 1500 |
| 3-4 | 100 | 25 | 700 |
| 3-5 | 100 | 25 | 900 |
| 3-6 | 100 | 25 | 1500 |

TABLE 4-continued

| Sample No. | Mixing ratio (wt. %) | | Firing Temp. (°C.) |
|---|---|---|---|
| | Active carbon | Polycarbodiimide powder | |
| 3-7 | 100 | 100 | 700 |
| 3-8 | 100 | 100 | 900 |
| 3-9 | 100 | 100 | 1500 |

From each of the composite materials obtained above was cut out a disc-shaped electrode of 10 mm in diameter and 1 mm in thickness. The electrode was measured for resistivity by a DC four-probe method. By using the electrode as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance. Each capacitor was further calculated for electric capacitance per unit volume and equivalent series resistance in the same manners as in Example 1. Their results are shown in Table 5.

TABLE 5

| Sample No. | Resistivity ($\Omega \cdot cm$) | Electric capacitance per unit volume (F/cm$^3$) | Equivalent series resistance ($\Omega$) |
|---|---|---|---|
| 3-1 | $5.8 \times 10^{-1}$ | 59.2 | 7.4 |
| 3-2 | $1.9 \times 10^{-2}$ | 67.4 | 2.4 |
| 3-3 | $9.0 \times 10^{-3}$ | 40.9 | 1.7 |
| 3-4 | $4.7 \times 10^{-1}$ | 65.1 | 6.5 |
| 3-5 | $1.5 \times 10^{-2}$ | 71.3 | 1.7 |
| 3-6 | $6.7 \times 10^{-3}$ | 57.4 | 1.1 |
| 3-7 | $7.3 \times 10^{-1}$ | 25.4 | 8.2 |
| 3-8 | $5.7 \times 10^{-2}$ | 32.7 | 1.1 |
| 3-9 | $1.7 \times 10^{-3}$ | 19.4 | 0.9 |

Example 4

The above-obtained polycarbodiimide powder (average particle diameter=10 μm) and an active carbon powder (average particle diameter=10 μm, specific surface area=1,800 m$^2$/g) were mixed at the mixing ratios shown in Table 6. To each mixed powder was added water, followed by agitation using an E type viscometer to obtain a paste of 20,000–35,000 cp. Each paste was cast and then heated, in a nitrogen atmosphere, to a temperature shown in Table 6 at a temperature elevation rate of 20° C. per hour to effect firing, whereby various vitreous carbon-active carbon composite materials were obtained.

TABLE 6

| Sample No. | Mixing ratio (wt. %) | | Firing Temp. (°C.) |
|---|---|---|---|
| | Active carbon | Polycarbodiimide powder | |
| 4-1 | 100 | 0.5 | 700 |
| 4-2 | 100 | 0.5 | 900 |
| 4-3 | 100 | 0.5 | 1500 |
| 4-4 | 100 | 25 | 700 |
| 4-5 | 100 | 25 | 900 |
| 4-6 | 100 | 25 | 1500 |
| 4-7 | 100 | 100 | 700 |
| 4-8 | 100 | 100 | 900 |
| 4-9 | 100 | 100 | 1500 |

From each of the composite materials obtained above was cut out a disc-shaped electrode of 10 mm in diameter and 1 mm in thickness. The electrode was measured for resistivity by a DC four-probe method. By using the electrode as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance. Each capacitor was further calculated for electric capacitance per unit volume and equivalent series resistance in the same manners as in Example 1. Their results are shown in Table 7.

TABLE 7

| Sample No. | Resistivity ($\Omega$.cm) | Electric capacitance per unit volume (F/cm$^3$) | Equivalent series resistance ($\Omega$) |
|---|---|---|---|
| 4-1 | $6.1 \times 10^{-1}$ | 59.8 | 7.5 |
| 4-2 | $2.0 \times 10^{-2}$ | 68.7 | 2.7 |
| 4-3 | $9.1 \times 10^{-3}$ | 42.1 | 1.9 |
| 4-4 | $4.9 \times 10^{-1}$ | 64.2 | 6.7 |
| 4-5 | $1.8 \times 10^{-2}$ | 69.2 | 1.9 |
| 4-6 | $7.0 \times 10^{-3}$ | 59.9 | 1.3 |
| 4-7 | $7.5 \times 10^{-1}$ | 27.8 | 8.5 |
| 4-8 | $6.0 \times 10^{-2}$ | 34.1 | 1.3 |
| 4-9 | $2.0 \times 10^{-3}$ | 21.5 | 1.1 |

Comparative Example 1

An active carbon powder (average particle diameter =10 μm, specific surface area=1,800 m$^2$/g) was mixed with a propylene carbonate solution containing 1 mole/liter of tetrabutylammonium perchlorate, to obtain a paste. The paste was coated on a stainless steel mesh to form a coating film of 1 mm in thickness, whereby an electrode was prepared.

The electrode was measured for resistivity by a DC four-probe method. By using the electrode (10 mm in diameter) as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. The capacitor was measured for electric capacitance. The capacitor was further calculated for electric capacitance per unit volume and equivalent series resistance in the same manners as in Example 1. Their results are shown in Table 8.

TABLE 8

| Resistivity ($\Omega$.cm) | Electyric capacitance per unit volume (F/cm$^3$) | Equivalent series resistance ($\Omega$) |
|---|---|---|
| 8.4 | 0.20 | 19.8 |

Comparative Example 2

An active carbon fiber (specific surface area=1,800 m$^2$/g) was press-bonded onto a stainless steel mesh in a fiber thickness of 1 mm, to prepare an electrode. This disc-shaped electrode was measured for resistivity by a DC four-probe method.

By using the electrode as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. The capacitor was measured for electric capacitance. The capacitor was further calculated for electric capacitance per unit volume and equivalent series resistance in the same manners as in Example 1. Their results are shown in Table 9.

TABLE 9

| Resistivity ($\Omega$.cm) | Electric capacitance per unit volume (F/cm$^3$) | Equivalent series resistance ($\Omega$) |
|---|---|---|
| 10.1 | 0.15 | 53.4 |

Comparative Example 3

A phenolic resin having a bulk density of 0.1 g/cm$^3$ was heated to 900° C. at a temperature elevation rate of 10° C. per minute in a nitrogen atmosphere to effect firing. The firing product was kept in a mixed gas of nitrogen and carbon dioxide for 3 hours for activation. The resulting material had a specific surface area of 1,800 m$^2$/g when measured by a BET method.

The material was cut into a disc-shaped sample of 10 mm in diameter and 1 mm in thickness. The sample was measured for resistivity by a DC four-probe method. By using the sample as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. The capacitor was measured for electric capacitance. The capacitor was further calculated for electric capacitance per unit volume and equivalent series resistance in the same manners as in Example 1. Their results are shown in Table 10.

TABLE 10

| Resistivity ($\Omega$.cm) | Electric capacitance per unit volume (F/cm$^3$) | Equivalent series resistance ($\Omega$) |
|---|---|---|
| 0.5 | 0.30 | 10.5 |

Comparative Example 4

An active carbon powder (average particle diameter =10 μm) and a polyethylene powder (average particle diameter =10 μm) were mixed at the mixing ratios shown in Table 11. Each mixture was agitated for 24 hours by a ball mill, then placed in a square mold having an internal dimension of 50 mm ×50 mm, and subjected to pressure molding at a pressure of 30 kg/cm$^2$ at 100° C. for 30 minutes.

TABLE 11

| Sample No. | Mixing ratio (wt. %) | |
|---|---|---|
| | Active carbon | Polyethylene powder |
| Comp. 4-1 | 100 | 0.5 |
| Comp. 4-2 | 100 | 25 |
| Comp. 4-3 | 100 | 100 |

Each of the samples (molded articles) was measured for resistivity by a DC four-probe method. By using each sample of 10 mm in diameter as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance. The capacitor was further calculated for electric capacitance per unit volume and equivalent series resistance in the same manners as in Example 1. Their results are shown in Table 12.

TABLE 12

| Sample No. | Resistivity (Ω.cm) | Electric capacitance per unit volume (F/cm³) | Equivalent series resistance (Ω) |
|---|---|---|---|
| Comp. 4-1 | 9.5 | 0.25 | 20.5 |
| Comp. 4-2 | 10.4 | 0.11 | 51.6 |
| Comp. 4-3 | 15.7 | 0.05 | 100.1 |

Comparative Example 5

An active carbon powder (average particle diameter =10 μm) and an acrylic acid latex were mixed at the mixing ratios shown in Table 13. Each mixture was agitated for 24 hours by a ball mill, then placed in a square mold having an internal dimension of 50 mm×50 mm, and subjected to pressure molding at a pressure of 30 kg/cm² at 100° C. for 30 minutes.

TABLE 13

| Sample No. | Mixing ratio (wt. %) | |
|---|---|---|
| | Active carbon | Acrylic acid latex |
| Comp. 5-1 | 100 | 0.5 |
| Comp. 5-2 | 100 | 25 |
| Comp. 5-3 | 100 | 100 |

Each of the samples (molded articles) was measured for resistivity by a DC four-probe method. By using each sample of 10 mm in diameter as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance. The capacitor was further calculated for electric capacitance per unit volume and equivalent series resistance in the same manners as in Example 1. Their results are shown in Table 14.

TABLE 14

| Sample No. | Resistivity (Ω.cm) | Electric capacitance per unit volume (F/cm³) | Equivalent series resistance (Ω) |
|---|---|---|---|
| Comp. 5-1 | 7.3 | 0.27 | 18.7 |
| Comp. 5-2 | 8.1 | 0.13 | 47.2 |
| Comp. 5-3 | 13.5 | 0.08 | 98.3 |

Comparative Example 6

A polycarbodiimide resin powder (average particle diameter=10 μm) and an active carbon powder (average particle diameter=10 μm, specific surface area=1,800 m²/g) were mixed at the mixing ratios shown in Table 15. Each mixture was agitated for 24 hours by a ball mill, then placed in a square mold having an internal dimension of 50 mm×50 mm, and subjected to pressure molding at a pressure of 30 kg/cm² at 100° C. for 30 minutes. Each of the resulting molded articles was heated, in a nitrogen atmosphere, to a temperature shown in Table 15 at a temperature elevation rate of 20° C. per hour to effect firing, whereby various vitreous carbon-active carbon composite materials were obtained.

TABLE 15

| Sample No. | Mixing ratio (wt. %) | | Firing Temp. (°C.) |
|---|---|---|---|
| | Active carbon | Polycarbodiimide | |
| Comp. 6-1 | 100 | 0.5 | 500 |
| Comp. 6-2 | 100 | 25 | 500 |
| Comp. 6-3 | 100 | 100 | 500 |

Each of the samples (composite materials) was measured for resistivity by a DC four-probe method. By using each sample of 10 mm in diameter as a positive electrode and also as a negative electrode and by impregnating the two electrodes, under vacuum, with a propylene carbonate solution containing 1 mole/liter of tetraethylammonium tetrafluoroborate, there was prepared an electric double layer capacitor. Each capacitor was measured for electric capacitance. The capacitor was further calculated for electric capacitance per unit volume and equivalent series resistance in the same manners as in Example 1. Their results are shown in Table 16.

TABLE 16

| Sample No. | Resistivity (Ω.cm) | Electric capacitance per unit volume (F/cm³) | Equivalent series resistance (Ω) |
|---|---|---|---|
| Comp. 6-1 | 5.2 | 0.50 | 15.4 |
| Comp. 6-2 | 7.5 | 0.25 | 19.3 |
| Comp. 6-3 | 10.2 | 0.13 | 46.1 |

Example 5

The vitreous carbon-active carbon composite material (the sample No. 1-2) prepared in Example 1 was made into a disc-shaped electrode (10 mm in diameter and 1 mm in thickness) in the same manner as in Example 1. The electrode was measured for resistivity by a DC four-probe method and gave a resistivity of 0.03 Ω·cm. By using this electrode as a positive electrode and also as a negative electrode and by impregnating the two electrodes with 30 wt. % sulfuric acid under vacuum, there was prepared an electric double layer capacitor. The capacitor was measured for electric capacitance and further calculated for electric capacitance per unit volume and equivalent series resistance at the 1st, 100th, 500th and 1,000th cycles, in the same manners as in Example 1. Their results are shown in Table 17.

TABLE 17

| Cycle No. | Electric capacitance per unit volume (F/cm³) | Equivalent series resistance (mΩ) |
|---|---|---|
| 1 | 131.8 | 25 |
| 100 | 131.4 | 25 |
| 500 | 131.0 | 28 |
| 1000 | 129.0 | 30 |

Comparative Example 7

100 parts by weight of the active carbon used in Example 1 and 0.5 part by weight of a phenol-formaldehyde resin powder (average particle diameter=10 μm) were mixed. Using the mixture, a disc-shaped electrode (10 mm in diameter and 1 mm in thickness) was prepared in the same manner as in Example 1. The electrode had a resistivity of 0.04 Ω·cm when measured by a DC four-probe method. By using this electrode as a positive electrode and also as a negative electrode and by impregnating the two electrodes with 30 wt. % sulfuric acid under vacuum, an electric double layer capacitor was prepared. The capacitor was measured for electric capacitance and further calculated for electric capacitance per unit volume and equivalent series resistance at the 1st, 100th, 500th and 1,000th cycles, in the same manners as in Example 1. Their results are shown in Table 18.

TABLE 18

| Cycle No. | Electric capacitance per unit volume (F/cm$^3$) | Equivalent series resistance (mΩ) |
|---|---|---|
| 1 | 106.3 | 75 |
| 100 | 103.3 | 82 |
| 500 | 100.4 | 98 |
| 1000 | 95.4 | 130 |

The vitreous carbon-active carbon composite material of the present invention is a composite material between a vitreous carbon derived from a polycarbodiimide resin and an active carbon, produced by firing a mixture of a polycarbodiimide resin and an active carbon in a non-oxidizing atmosphere, and is superior particularly in chemical resistance. Therefore, the polarizable electrode of the present invention for use in electric double layer capacitor, consisting of said vitreous carbon-active carbon composite material has a small internal resistance, a large electric capacitance and a long life.

What is claimed is:

1. A vitreous carbon-active carbon composite material consisting of active carbon dispersed in a binder of vitreous carbon, said composite material being obtained by firing a mixture of a polycarbodiimide resin and an active carbon in a non-oxidizing atmosphere at a temperature of 700°–1500° C., whereby said polycarbodiimide resin is converted to said vitreous carbon.

2. A vitreous carbon-active carbon composite material according to claim 1, wherein the active carbon is in particulate form.

3. A vitreous carbon-active carbon composite material according to claim 2, wherein the active carbon is in powder form.

4. A vitreous carbon-active carbon composite material according to claim 2, wherein the active carbon is in the form of fibers.

5. A vitreous carbon-active carbon composite material according to claim 2, wherein the active carbon has a specific surface area of at least 500 m$^2$/g.

6. A vitreous carbon-active carbon composite material according to claim 1, wherein the amount of vitreous carbon in the vitreous carbon-active carbon composite material is 0.5–100 parts by weight per 100 parts by weight of the active carbon.

7. In an electric double layer capacitor comprising electrodes and an electrolyte, the improvement wherein an electrode is a vitreous carbon-active carbon composite material consisting of active carbon dispersed in a binder of vitreous carbon, said composite material being obtained by firing a mixture consisting of a polycarbodiimide resin and an active carbon in a non-oxidizing atmosphere at a temperature of 700°–1500° C., whereby said polycarbodiimide resin is converted to said vitreous carbon.

* * * * *